June 27, 1961 R. G. FRANK 2,989,781
ROTARY MOLDING MACHINE
Filed Oct. 6, 1958 3 Sheets-Sheet 1

INVENTOR.
RAYMOND G. FRANK
BY Arthur H. Seidel
ATTORNEY

INVENTOR.
RAYMOND G. FRANK
BY
Arthur H. Seidel
ATTORNEY

June 27, 1961  R. G. FRANK  2,989,781
ROTARY MOLDING MACHINE
Filed Oct. 6, 1958  3 Sheets-Sheet 3

INVENTOR.
RAYMOND G. FRANK
BY
Arthur H. Seidel
ATTORNEY

United States Patent Office 2,989,781
Patented June 27, 1961

2,989,781
ROTARY MOLDING MACHINE
Raymond G. Frank, Ambler, Pa., assignor to F. J. Stokes Corporation, Philadelphia, Pa., a corporation of Pennsylvania
Filed Oct. 6, 1958, Ser. No. 765,502
7 Claims. (Cl. 18—20)

This invention relates to a rotary molding machine and more particularly to a rotary tablet machine or the like. More specifically, the present invention is directed to a rotary mold press having an improved construction for locking the mold dies in the die table.

Most rotary mold presses, such as a rotary tablet machine or the like, include a rotatable die table having a plurality of circumferentially spaced die holes therein extending from the upper surface of the die table and positioned adjacent the outer periphery of the die table, a die fitting into each of the die holes, and means for individually locking each of the dies in their respective die holes. The means heretofore used for locking each of the dies in its die hole comprised a locking screw or plug hole extending substantially radially through the die table from its outer edge with the center line of the locking screw hole being substantially tangent to the die hole so that the locking screw hole had a portion of its side opening into the die hole, and a locking screw hole and extending through and across a groove in the periphery of the die.

However, such means for locking the die in its die hole have many disadvantages.

A major disadvantage of this means for locking the dies in their die holes arises from the fact that the locking screw holes extend radially between the die holes so that the die holes must be spaced apart a sufficient distance to accommodate the locking screw holes. This limits the number of dies which can be placed on the die table so as to limit the number of molds which can be made per revolution of the die table, which in turn limits the speed of operation of the machine.

Another disadvantage of this locking means arises from the fact that the locking screw holes are blind holes so that in drilling the holes it is difficult to remove all chips to insure a clean hole, and during the use of the machine it is difficult to inspect and clean the holes.

Still another disadvantage of this locking means is that during the use of the machine if the locking screw or plug breaks, it is difficult to remove the broken pieces from the blind hole.

It is an object of the present invention to provide an improved means for locking the dies in the die table of a rotary molding machine.

It is another object of the present invention to provide a means for locking the dies in the die table of a rotary molding machine which permits closer spacing of the dies on the die table and thereby increases the speed of operation of the machine.

It is still another object of the present invention to provide a means for locking the dies in the die table of a rotary molding machine which is easy to manufacture and maintain.

It is a further object of the present invention to provide a means for locking the dies in the die table of a rotary molding machine which permits for ease of removal of the pieces of a broken locking screw or plug.

These and other objects of the present invention are achieved by providing a locking screw or plug hole which extends from the outer edge of the die table along a chord of the die table and substantially tangential to its respective die hole with the inner end of the locking screw hole opening into the adjacent die hole. Thus, the locking screw holes do not extend between the die holes so that the die holes can be placed closer together, thereby permitting more dies to be mounted on the die table for faster and more efficient operation of the machine. Furthermore, since the locking screw holes are open at both ends, they can be easily drilled and cleaned, and the pieces of a broken locking screw or plug can be easily removed from either end thereof.

For the purpose of illustrating the invention there is shown in the drawings a form which is presently preferred; it being understood, however, that this invention is not limited to the precise arrangements and instrumentalities shown.

Figure 1:
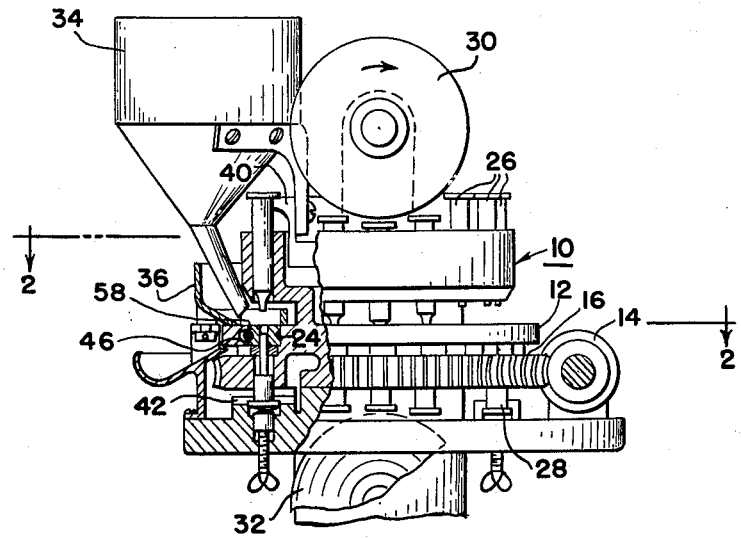
FIGURE 1 is a side elevation view, partially in section, of a rotary tablet machine which includes the die locking means of the present invention.
Figure 2:
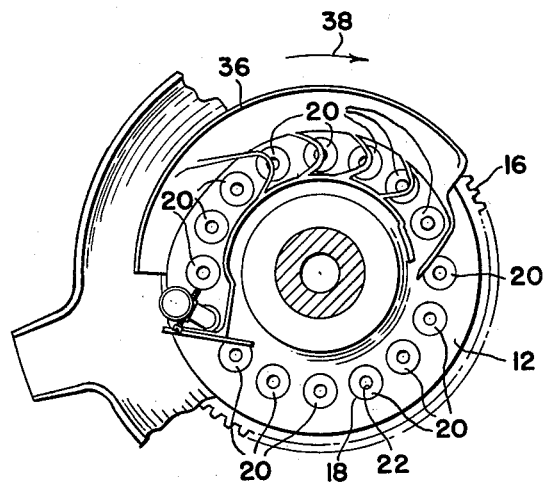
FIGURE 2 is a sectional view taken on line 2—2 of FIGURE 1, with parts being broken away for clarity.

Referring to the drawings, FIGURES 1 and 2 show a rotary tablet machine in which the die locking means of the present invention can be used. However, it should be understood that the rotary molding machine shown in FIGURES 1 and 2 is not the only machine in which the die locking means of the present invention can be used, but is only illustrative of the many well known types of rotary molding machines having a rotary die table in which the die locking means of the present invention can be used. The details of the structure and operation of the rotary tablet machine shown in FIGURES 1 and 2 are described in United States Letters Patent No. 1,289,570, issued December 31, 1918.

In general, the rotary tablet machine shown in FIGURES 1 and 2 comprises a rotary head 10 having a circular die table 12 and driven by a worm gear 14 which engages gear 16 on head 10. Die table 12 has a plurality of circumferentially spaced die holes 18 therein extending from the upper surface of the die table 12 and a die 20 is seated in each of the die holes 18. Dies 20 are all identical in shape and size and are each provided with a central mold hole 22 and a peripheral locking groove 24. Head 10 is provided with a plurality of top punches 26 and a similar number of bottom punches 28 which cooperate with the die mold holes 22. A roll 30 is rotatably mounted above top punches 26 for engagement with the top of the punches. A second roll 32 is rotatably mounted beneath bottom punches 28 for engagement with the bottom surfaces thereof. A hopper 34 is provided to feed the material to be molded to a feed frame 36 which in turn serves to feed the material into the die mold holes 22.

In operation, rotary head 10, including die table 12 and punches 26 and 28, are rotated by worm gear 14 in the direction of arrow 38 (FIGURE 2). The material to be molded is fed from hopper 34 to feed frame 36 which scoops the material into the die mold hole 22 as the dies pass under the feed frame 36. When punches 26 and 28 pass between rolls 30 and 32, top punch 26 is pressed downwardly into die mold hole 22 and bottom punch 28 is pressed upwardly to compress the material in the die mold hole. After punches 26 and 28 pass from between the rolls 30 and 32, top punch 26 is lifted from the die mold hole 22 by a camming surface 40 and bottom punch 28 is moved upwardly by a camming surface 42 to eject the molded piece.

Figure 3:
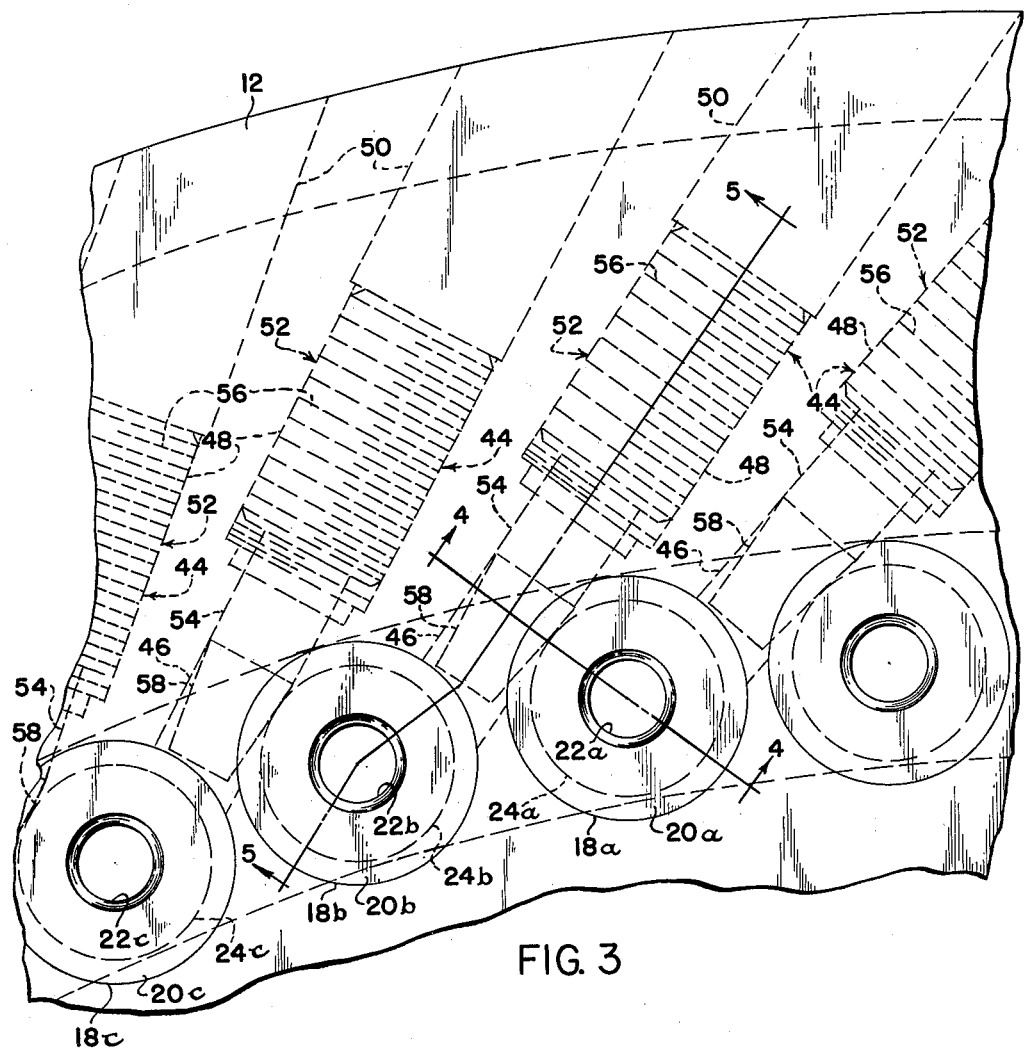
FIGURE 3 is a top elevation view of a portion of the die table showing the die locking means of the present invention.
Figure 4:
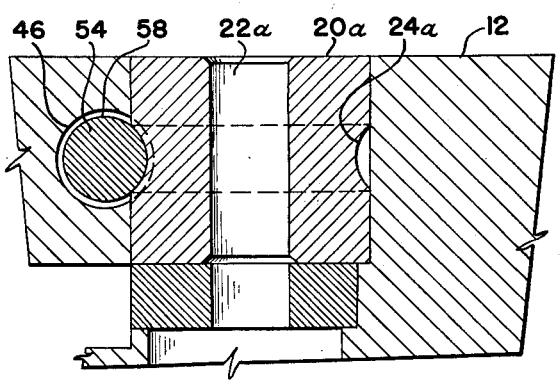
FIGURE 4 is a sectional view of the die table taken along line 4—4 of FIGURE 3.

FIGURE 3 shows the die to die table locking means of the present invention. Since the locking means for each of dies 20a, 20b, 20c, etc. are identical, a detailed description of the die locking means for die 20a will be given as illustrative of the locking means for each of the dies.

Figure 5:
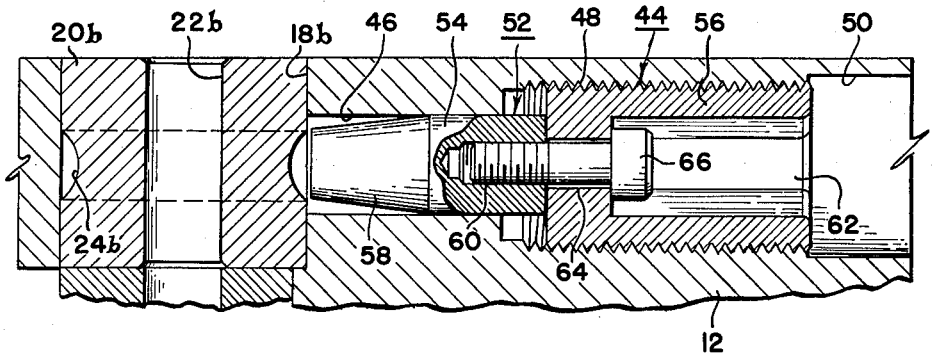
FIGURE 5 is a sectional view of the die table taken along line 5—5 of FIGURE 3.

The die to die table locking means of the present invention comprises a locking member hole, generally designated as 44, extending from the outer periphery of die table 12 along a chord of the die table. Locking member hole 44 has an inner plug receiving portion 46, an intermediate screw receiving portion 48, which is threaded and of a larger diameter than the plug receiving portion 46, and an outer counterbored portion 50. Locking member hole 44 is at an angle such that the plug receiving portion 46 is substantially tangential to but extends across a portion of die hole 18a, so that a portion of the plug receiving portion 46 opens into die hole 18a, and the inner end of the plug receiving portion 46 opens directly into the adjacent die hole 18b. The manner of determining the angle of locking member hole 44 will be described later. A locking member, generally designated as 52, fits into locking member hole 44 in the manner as will be described. Referring to FIGURE 5, locking member 52 comprises a plug 54 and a screw member 56, both of circular cross-section. Plug 54 is of a diameter to fit into plug receiving portion 46 with a slight clearance, and has a tapered front end portion 58 and a longitudinally extending, threaded hole 60 in its rear end. Screw member 56 is larger in diameter than plug 54 and is threaded on its outer surface to match the threads of screw portion 48 of locking member hole 44. Screw member 56 is provided with a non-circular tool receiving hole 62 extending longitudinally from its rear end, and a smaller central hole 64 extending therethrough from the tool receiving hole 62. A headed bolt 66 extends through the screw member hole 64 and is threaded in the plug hole 60 to secure the plug 54 to the screw member 56. Locking member 52 fits in locking member hole 44 with the plug 54 extending through plug receiving portion 46 and screw member 56 being threaded in screw portion 48 to hold the locking member 52 in the locking member hole 44. Thus, a portion of plug 54 projects into die hole 18a and extends through and across the peripheral groove 24a in die 20a so as to lock die 20a in die table 12.

Since the locking member holes 44 do not extend diagonally between the die holes 18 but along a chord of the die table 12, the die holes 18 can be placed closer together. This permits a greater number of dies 20 to be mounted on die table 12 so that a greater number of molds can be produced during each revolution of die table 12 which in turn increases the speed of operation and efficiency of the machine.

Even though the number of die holes is increased and the die holes are closer together, the amount of metal between the die holes using the chordal arranged locking member of the present invention is greater than if the locking members extended radially between the die holes so that the die table of the present invention is structurally stronger than the previously available die tables.

Since the inner end of each of the locking member holes 44 opens into a die hole 18, the die table 12 is much simpler to manufacture since in drilling locking member holes 44 it is only necessary to permit the drill to run out into the adjacent die hole 18. Furthermore, since locking member holes 44 are open at both ends, any drill chips and dirt can be easily cleaned from the hole and the holes are easy to inspect. In addition, this construction of the locking member hole 44 and locking member 52 permits simpler removal of a broken or separated locking member. Thus, if plug 54 becomes broken or separated from screw member 56, it is only necessary to remove bolt 66, thread out screw member 56, and after having removed the die from the adjacent die hole, the broken or separated plug 54 can be easily pushed out through the adjacent die hole.

Figure 6:
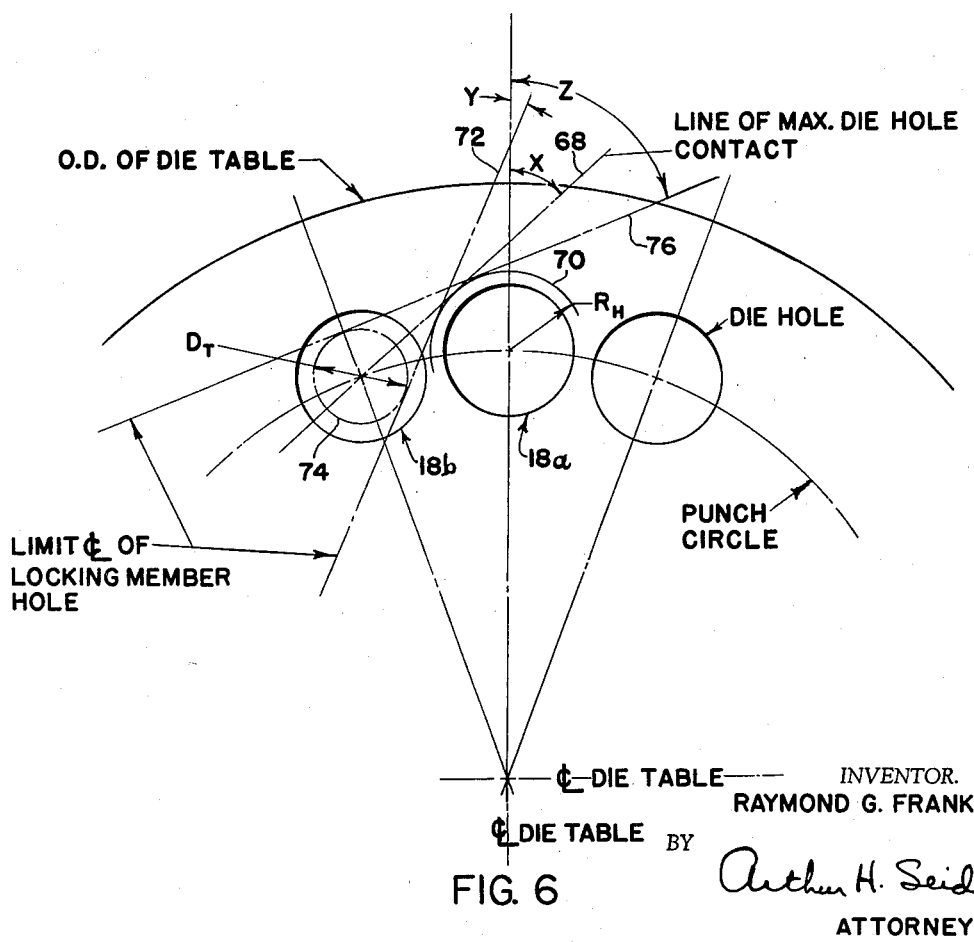
FIGURE 6 is a diagrammatic view of a portion of the die table showing the method of locating the position of the locking screw holes.

FIGURE 6 shows the manner for determining the drilling angle for drilling the locking member holes 44. By drilling angle it is meant the angle between the diameter of the die table 12 extending through the center of the die hole 18 and the axial center of the locking member hole 44. To determine the drilling angle X for a locking member hole 44 having maximum die hole contact, a line 68 is drawn tangent to a circle 70 of a radius $R_H$ around die hole 18a and through the center of the adjacent die hole 18b. The radius $R_H$ is equal to the distance between the center of the die hole 18a and the axial center of the locking member hole, which distance is dependent upon the diameter of plug 54, the diameter of die 20, the radius and depth of the peripheral groove 24 in die 20, and the taper of the tapered portion 58 of plug 54. To determine the minimum permissible drilling angle Y, line 72 is drawn tangent to circle 70 and tangent to the inner side of a circle 74 of a diameter $D_T$ within the adjacent die hole 18b. The diameter $D_T$ is equal to the diameter of the drill hole 18 minus the diameter of the plug receiving portion 46 of locking member hole 44. To determine the maximum permissible drilling angle Z, a line 76 is drawn tangent to circle 70 and tangent to the outer side of circle 74. Reducing the drilling angle beyond the minimum drilling angle Y would seriously impair the structural strength of the die table 12 by reducing the web metal between the die holes, and increasing the drilling angle beyond the maximum drilling angle Z would also reduce the structural strength of the drill table 12 because of the metal reduction between adjacent locking member holes 44. The locking member holes 44 are preferably positioned with respect to the top of die table 12 so that the center of the locking member holes 44 are spaced from the top surface of the die table 12 a distance slightly greater than the distance between the top surface of die 20 and the center of its peripheral groove 24, so that the plugs 54 provide a downward thrust on the dies 20 to hold the dies 20 in the die holes 18.

The present invention may be embodied in other specific forms without departing from the spirit or essential attributes thereof and, accordingly, reference should be made to the appended claims, rather than to the foregoing specification as indicating the scope of the invention.

I claim:

1. A rotary molding machine comprising a circular die table having a plurality of circumferentially spaced die holes therein extending from the upper surface thereof; a die in each of said die holes, each of said dies having a central mold hole in the upper surface thereof and a peripheral groove; separate means for locking each of said dies in its respective die hole, each of said locking means comprising a locking member hole in said die table extending from the outer edge of said table along a chord of said table and extending across the die hole so that a portion of the side of said locking member hole opens into said die hole, the inner end of each of said locking member holes extending to and opening into an adjacent die hole, and a locking member in said locking member hole and extending across and through a portion of the peripheral groove in the die; means for rotating said die table; a plurality of die punches associated with said die table such that each punch is in alignment with the mold hole of a respective die; and means for successively moving said die punches into said mold holes as the die table rotates to compress any material in said mold holes.

2. A rotary molding machine as set forth in claim 1 in which each of said locking member holes has a plug receiving portion which extends across the die hole, and a threaded screw receiving portion outwardly of said plug receiving portion; and each of said locking members comprises a plug portion fitting into said plug receiving portion of the locking member hole, and a screw threaded into said screw receiving portion of the locking member hole.

3. A rotary molding machine as set forth in claim 2 in which the plug and screw of said locking member are separate, and a headed bolt extends through a hole in said screw and is threaded into a hole in said plug to secure the plug and screw together.

4. A rotary molding machine as set forth in claim 2 in which the angle of the axial center line of each of said locking member holes with respect to the diameter of said die table passing through the center of the locking member hole's respective die hole is between the angles of two lines with respect to said die table diameter, the two lines being both tangent to a first circle of a radius equal to the distance between the center of said respective die hole and the axial center line of said locking member hole with the first circle surrounding the respective die hole, and tangent to different points on a second circle of a diameter equal to the diameter of said die hole minus the diameter of said plug receiving portion of said locking member hole with said second circle being within an adjacent die hole.

5. A rotary molding machine as set forth in claim 2 in which the axial center line of each of said locking member holes lies on a line which is tangent to a circle of a radius equal to the distance between the center of the die hole and the axial center of said locking member hole with the circle surrounding the respective die hole, and passes through the center of an adjacent die hole.

6. A circular die table having a plurality of circumferentially spaced die holes therein extending from the upper surface thereof; a die in each of said die holes, each of said dies having a central hole in the upper surface thereof and a peripheral groove; and separate means for locking each of said dies in its respective die hole, each of said locking means comprising a locking member hole in said die table extending from the outer edge of said table along a chord of said table and extending across the die hole so that a portion of the side of said locking member hole opens into said die hole tangentially, the inner end of each of said locking member holes extending to and opening into an adjacent die hole, said chord having a length less than the diameter of the table, and a locking member in said locking member hole and extending across and through a portion of the peripheral groove in the die.

7. A circular die table having a plurality of circumferentially spaced die holes therein extending from the upper surface thereof, a die in each of said die holes, each of said dies having a peripheral groove on its outer periphery, and a separate means for locking each of said dies in its respective die hole in said die table, each of said locking means including a locking hole extending from the outer edge of said table along a chord of said table and extending across the die hole so that a portion of the locking hole opens into one of said die holes tangentially, said chord having a length less than the diameter of said table and extending toward the next adjacent die hole so that a continuation of the longitudinal axis of said locking hole would intersect said next adjacent die hole, and a locking member in said locking hole and extending across and through a portion of the peripheral groove in the die in said one die hole.

References Cited in the file of this patent

UNITED STATES PATENTS

| 483,095 | Barrow | Sept. 20, 1892 |
| 639,919 | Colton | Dec. 26, 1899 |
| 901,937 | Scott | Oct. 20, 1908 |
| 2,382,509 | Seiter | Aug. 14, 1945 |
| 2,504,751 | Studli | Apr. 18, 1950 |
| 2,903,784 | Billman | Sept. 15, 1959 |

FOREIGN PATENTS

| 328,338 | Great Britain | May 1, 1930 |